United States Patent [19]

Bendall

[11] 4,047,395
[45] Sept. 13, 1977

[54] TORSIONALLY RESILIENT GEAR COUPLING

[76] Inventor: Wilfrid H. Bendall, Elmwood St., Old Saybrook, Conn. 06475

[21] Appl. No.: 729,841

[22] Filed: Oct. 4, 1976

[51] Int. Cl.² ............... F16D 3/52; F16D 3/56; F16D 3/66; F16D 3/14
[52] U.S. Cl. .................. 64/15 B; 64/9 R; 64/14; 64/27 B
[58] Field of Search ........... 64/27 S, 27 R, 15 R, 64/12, 9 A, 1 C, 1 S, 14, 15 BA, 9 R, 27 B; 74/411

[56] References Cited

U.S. PATENT DOCUMENTS

| 2,618,136 | 11/1952 | Wellauer | 64/1 C |
| 2,904,976 | 9/1959 | Bay et al. | 64/12 X |
| 3,955,377 | 5/1976 | Bendall | 64/15 B X |

Primary Examiner—Leonard H. Gerin

[57] ABSTRACT

Coaxially spaced externally toothed gears are bridged and interconnected by a resilient annular gear formed from a coil of flexible material having corrugations shaped to engage the gear teeth. The external peripheral of the annular gear is enclosed by a sleeve member maintaining it in resiliently wedged circumferential driving engagement with the externally toothed gears.

10 Claims, 3 Drawing Figures

TORSIONALLY RESILIENT GEAR COUPLING

SUMMARY OF THE INVENTION

This invention is a modification of, and improvement on, applicant's prior U.S. Pat. No. 2,737,033 issued Mar. 6, 1956, for a resilient gear coupling.

Of the numerous designs of flexible couplings for mechanical power transmission disclosed in the prior art, the gear type coupling, in design simplicity and power transmission capacity, is acknowledged pre-eminent. However, its component parts are essentially rigid in principle and its assembly is only kinematically flexible. Increasing coupling requirements for high torsional resilience together with high misalignment accommodation and ability to absorb shock and vibration generally have to turn to coupling constructions embodying elastomers. These usually result in considerably larger over all coupling dimensions for equivalent transmission capacity. Hence, attainment of the basic gear coupling capability in a torsionally resilient structure embodying the desired misalignment and vibration damping accommodation, particularly if adapted to all metal fabrication, would constitute a new and useful contribution to the art. This accordingly will be understood as the primary object of the present invention. Important other objects are to provide such a coupling low in construction cost and free from protruding parts constituting operational hazards; also, a coupling construction easily balanced for high speed operation and with component parts conveniently accessible for manual assembly, alignment and maintenance.

The foregoing objects and other objects and advantages of this invention will be apparent to those knowledgeable in the art following reference to the accompanying description, drawing figures and claims of this specification.

THE DRAWINGS

DETAILED DESCRIPTION

Figure 1:
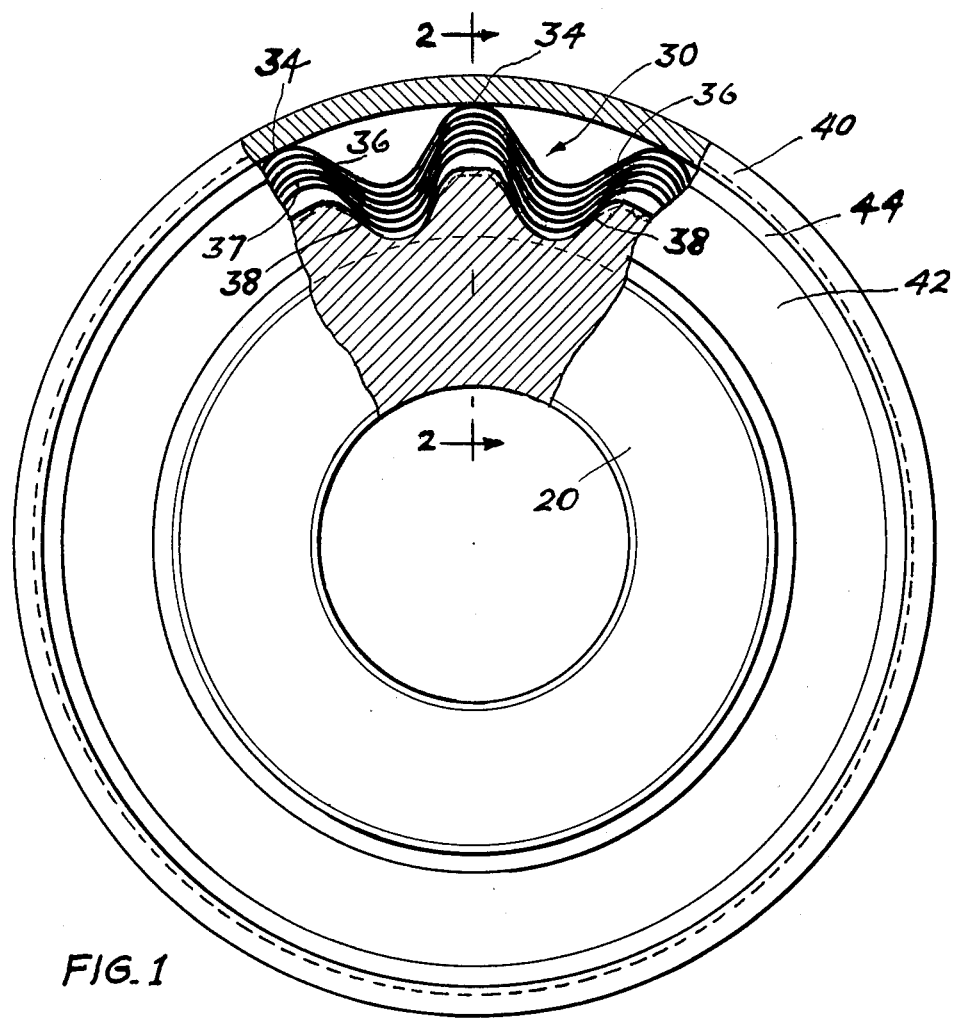
FIG. 1 is a diagrammatic partly sectioned end elevational view of the torsionally gear coupling of this invention.
Figure 2:
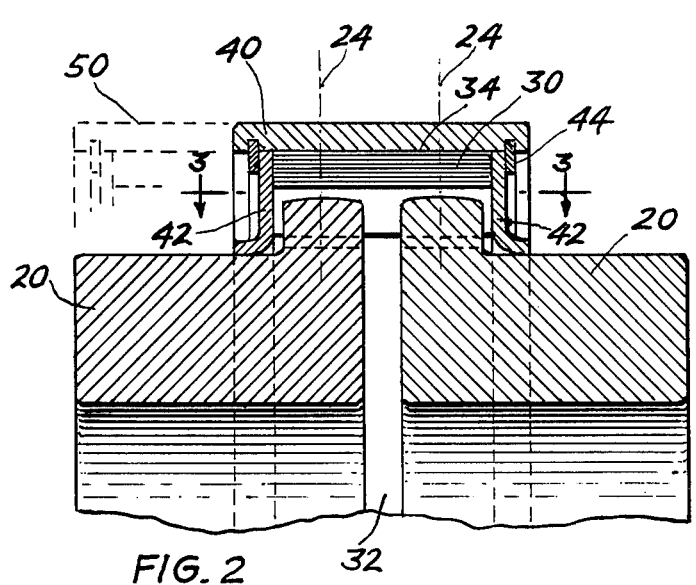
FIG. 2 is a partial sectional view taken on the line 2—2 of FIG. 1.

Referring to the drawings, in FIGS. 1 and 2 reference numeral 20 designates identical, axially spaced, externally toothed drive gears adapted for connection to driving and driven members, interconnected by a resilient annular gear 30 bridging the space 32 between the gears. Annular gear 30 comprises a length of thin resilient material, such as spring tempered steel, uniformly corrugated and coiled freely on itself with meshing corrugations—the corrugations thereof being shaped to engage the teeth of the externally toothed drive gears. A concentric sleeve member 40 extends over the periphery of the annular gear, retaining it on the drive gears. The external periphery of the annular gear is in tangential bearing contact with the inner periphery of the sleeve member at axially extending, circumferentially spaced lines 34, defined by the corrugation spacing. Annular gear 30 thus is in elastically wedged restraint between the externally toothed gears and the inner periphery of the sleeve member, the essential function of the sleeve member being to support the radial separating component of the tangential drive gear tooth pressures exerted on the internal teeth of the resilient annular gear. The ends of the annular gear and sleeve member are enclosed and removably retained on the drive gears by sealing members 42 and snap rings 44.

For clarity of illustration the individual corrugated layers of the annular gear 30 are indicated diagrammatically by solid lines since, in the majority of applications, the corrugated material is relatively thin (0.005–0.020 inch) spring steel or equivalent material. The corrugation form shown also is somewhat exaggerated in relative proportions and clearances to facilitate illustration. In practice the corrugations may be proportionately finer and more closely intermeshed. Uniformly corrugated as shown the flexible layers comprising the annular gear can be coiled in free superposition to any required radial thickness, limited only by the permissible distension of the outermost layer in a given annular diameter. In the preferred construction a plurality of such corrugated layers provides the desired shear strength between the drive gears and also provides a plurality of tangential, axially extending corrugation interface contact "lines" 36 between the corrugation apexes 37. Under load these contact "lines" increase appreciably to comprise contact areas which convey a substantial degree of hysteresis or energy damping. The final assembly of the coupling parts thus described comprises a torsionally resilient gear coupling with four structural components initially in relatively frictionless tangential rolling contact at engagement points 34, 36 and 38, and in which the flexural action of the laminated annular gear under increased loads provides high compound misalignment accommodation and instant internal damping of drive shocks and vibration.

Figure 3:
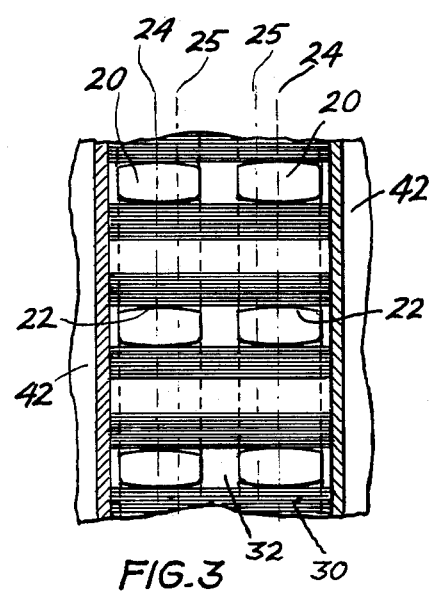
FIG. 3 is a sectional expanded view taken on the line 3—3 of FIG. 2.

As shown in FIG. 3 the teeth of the drive gears 20 preferably have arcuate working faces 22 to accommodate misalignment without objectionable edge loading at the working contacts with the annular gear. Driving contact between the gear toothed elements normally is substantially in the plane indicated by lines 24, 24, and moves closer, as at lines 25, 25 under increased loads.

The annular gear 30 is economically fabricated by running pretempered spring steel strip between loosely meshed forming gears of the desired circular pitch. The corrugated material can be simultaneously preformed to the required minimum coil diameter so that it re-coils naturally to the specified coupling dimension for handling and assembly. Drive gear teeth are shaped to engage the resulting corrugation form. A dry or semifluid lubricant applied to the annular gear corrugations and operating clearances during assembly increases vibration damping and protects the working contacts against fretting. Any lubricating medium thus applied is retained by the end closure members 42 and snap rings 44.

The simple assembly of the coupling of this invention facilitates installation, disconnection and replacement of the annular gear element without disturbing the initial drive alignment. Disconnection in situ is readily accomplished as indicated in FIG. 2. Removal of a snap ring and end closure at either end of the coupling permits sliding the sleeve and annular gear over either drive gear to the position indicated by the dash outline 50.

The forms of this invention herewith shown and described are to be taken as preferred examples of the same, and it is to be understood that various changes may be made in the shape, size and arrangement of the parts. For example, the internal periphery of the outer sleeve member may be provided with gear teeth to engage the outer corrugated layer of the annular gear and the drive gear tooth surfaces may be shaped for internally tangential working contact with the corrugations of the latter—all such variations being considered as coming within the scope of the appended claims.

What is claimed is:

1. A torsionally resilient gear coupling for connecting axially spaced driving and driven members, said coupling comprising an externally toothed gear connected to each of said members interconnected by a resilient annular gear bridging the space between the gears, said annular gear comprising a plurality of concentric, uniformly corrugated flexible laminas, the corrugations thereof being shaped to mesh tangentially with each other and with the teeth of the externally toothed gears; a concentric sleeve member extending axially over the periphery of the annular gear and in retentive contact therewith, said sleeve member supporting the radial component of tangential gear tooth forces transmitted to the annular gear, said annular gear being in resiliently compressed driving engagement between the internal periphery of the sleeve member and the externally toothed gears, and means enclosing the ends of the sleeve member and annular gear.

2. The gear coupling of claim 1 in which the annular gear further comprises a continuous length of corrugated material coiled freely on itself with meshing corrugations.

3. The gear coupling of claim 2 in which the corrugated material is preformed to a given coil diameter.

4. The gear coupling of claim 1 wherein the annular gear is in radially wedged restraint between the sleeve member and the externally toothed gears.

5. The gear coupling of claim 1 wherein the teeth of the externally toothed gears are axially acruate in form.

6. The gear coupling of claim 1 wherein the corrugations of the annular gear having axially extending circumferentially spaced lines of contact with each other.

7. The gear coupling of claim 6 wherein the outer corrugations of the annular gear have axially extending circumferentially spaced lines of contact with the sleeve member.

8. The gear coupling of claim 1 wherein the corrugations of the annular gear have initially limited aras of working contact under a normal working load and automatically increased areas of working contact under a heavier than normal load.

9. The gear coupling of claim 8 wherein the increased areas of working contact constitute coupling vibration and shock damping means.

10. The gear coupling of claim 1 further comprising radially spaced inner and outer coupling member having a resilient annular member interposed therebetween, said annular member being in geared driving contact with one of the coupling members and in frictionally wedged driving contact with the other coupling member.

* * * * *